United States Patent
Patwa et al.

(10) Patent No.: US 9,684,613 B2
(45) Date of Patent: Jun. 20, 2017

(54) METHODS AND SYSTEMS FOR REDUCING SPURIOUS INTERRUPTS IN A DATA STORAGE SYSTEM

(71) Applicant: Seagate Technology LLC, Cupertino, CA (US)

(72) Inventors: Nital Patwa, San Jose, CA (US); Timothy Canepa, Los Gatos, CA (US); Yimin Chen, Sunnyvale, CA (US)

(73) Assignee: Seagate Technology LLC, Cupertino, CA (US)

( * ) Notice: Subject to any disclaimer, the term of this patent is extended or adjusted under 35 U.S.C. 154(b) by 279 days.

(21) Appl. No.: 14/277,920

(22) Filed: May 15, 2014

(65) Prior Publication Data

US 2014/0344492 A1    Nov. 20, 2014

Related U.S. Application Data

(60) Provisional application No. 61/823,612, filed on May 15, 2013.

(51) Int. Cl.
    *G06F 13/24*    (2006.01)
(52) U.S. Cl.
    CPC ...... *G06F 13/24* (2013.01); *G06F 2213/2408* (2013.01); *Y02B 60/1228* (2013.01)
(58) Field of Classification Search
    CPC ...... G06F 13/24; G06F 9/4812; G06F 3/0659; G06F 2213/2408
    See application file for complete search history.

(56) References Cited

U.S. PATENT DOCUMENTS

| | | | |
|---|---|---|---|
| 6,014,709 A | 1/2000 | Gulick et al. | |
| 6,065,089 A * | 5/2000 | Hickerson | G06F 9/4825 710/266 |
| 6,263,395 B1 | 7/2001 | Ferguson et al. | |
| 7,188,203 B2 | 3/2007 | Mowry et al. | |
| 7,194,608 B2 * | 3/2007 | Mericas | G06F 9/3017 712/227 |
| 8,478,924 B2 * | 7/2013 | Ahmad | G06F 9/4812 710/262 |
| 8,605,578 B1 * | 12/2013 | Govindaraju | H04L 1/1838 370/229 |
| 9,152,588 B2 * | 10/2015 | Gulati | G06F 13/24 |
| 9,164,935 B2 * | 10/2015 | Klein | G06F 13/24 |

* cited by examiner

*Primary Examiner* — Brian Misiura
(74) *Attorney, Agent, or Firm* — Westman, Champlin & Koehler, P.A.

(57) ABSTRACT

A storage controller of a data storage system maintains, for each interrupt vector, (1) a pending status that indicates whether one or more completions are pending in the completion queue (CQ) associated with the interrupt vector, and (2) an in-progress status that indicates whether or not the storage controller is currently in the process of composing an interrupt. The storage controller utilizes these two statuses to reduce or eliminate spurious interrupts by preventing an interrupt from being composed if there are no completions in the CQ, by preventing an interrupt from being composed if the corresponding interrupt mask has been set before composition of the interrupt begins, and by preventing an interrupt from being sent to the host system in cases where the interrupt mask was set after composition of the interrupt began, but before the interrupt has been sent to the host system.

22 Claims, 4 Drawing Sheets

METHODS AND SYSTEMS FOR REDUCING SPURIOUS INTERRUPTS IN A DATA STORAGE SYSTEM

TECHNICAL FIELD OF THE INVENTION

The invention relates generally to data storage systems and, more particularly, to methods and systems for reducing spurious interrupts in a data storage system.

BACKGROUND OF THE INVENTION

A typical data storage system includes a host system, a storage controller that is in communication with the host system, and a storage array that is in communication with the storage controller. The storage array typically includes an array of physical disks (PDs), which may be hard disk drives (HDDs), solid state disks (SSDs) or similar persistent storage units. A storage array can be configured to allow large amounts of data to be stored and accessed in a very efficient manner. FIG. 1 illustrates a block diagram of a typical data storage system 2. The system 2 includes a host system 3, a storage controller 4, a peripheral interconnect Express (PCIe) bus 5, and an array of PDs 9. The host system 3 includes a system central processing unit (CPU) 11 and a system memory device 12. The storage controller 4 includes a controller CPU 6, a controller dynamic random access memory (DRAM) device 7, and an I/O interface device 8. The I/O interface device 8 is configured to perform data transfer in compliance with known data transfer protocol standards, such as the Serial Attached SCSI (SAS) standard, the Serial Advanced Technology Attachment (SATA) standard, or the Nonvolatile Memory Host Controller Interface Express (NVMe) standard. The I/O interface device 8 controls the transfer of data to and from the PDs 9.

The storage controller 4 communicates via the bus 5 with the system CPU 11 and with the system memory device 12. The system memory device 12 stores software programs for execution by the system CPU 11 and data. During a typical write action, the system CPU 11 runs a memory driver software stack 14 that stores commands and data in the system memory device 12. The commands and data are subsequently transferred via the bus 5 to the storage controller 4 and written by the controller CPU 6 to the controller memory device 7. The storage controller 4 may include a direct memory access (DMA) device 13 for transferring commands and data from the system memory device 12 into the controller memory device 7.

When the controller CPU 6 completes a command or a string of commands, it posts a hardware interrupt to the host system 3 to notify the host system 3 that the command or string of commands has been completed. In storage systems that use the Nonvolatile Memory Express (NVMExpress) PCIe Host Controller Interface specification, interrupts are posted to the host system 3 by the storage controller 4 to inform the host system 3 that the storage controller 4 has completed a number of commands and has posted associated completion entries in associated Completion Queues (CQs) located in the system memory device 12.

The storage controller 4 may be configured to post interrupts in multiple modes. Among these modes, a mode known as Message Signaled Interrupts (MSI) or (MSI)-X, the latter of which is defined in a standard known as PCI 3.0, is recommended to enable higher performance, lower latency, and lower CPU utilization for processing interrupts. MSI-X allows a device to generate multiple separate interrupts which are managed by a host on a per-vector basis. Each interrupt is associated with an interrupt vector and each interrupt vector is associated with one or more CQs in the system memory device 12. For each interrupt vector, the host maintains a respective MSI-X mask that comprises bits that are set or cleared by the host system 3.

When the storage controller 4 completes a command, it posts a completion in an associated CQ of the system memory 12 and posts an MSI-X interrupt to the host system 3 via a Memory Write Transaction Layer Packet (MWr TLP). The host system 3 maintains the MSI-X mask. When the MSI-X mask associated with an interrupt vector is set, this informs the storage controller 4 that it is not to send any interrupts associated with that particular interrupt vector to the host system 3. When the MSI-X mask associated with an interrupt vector is cleared, this informs the storage controller 4 that it is allowed to send an interrupt associated with that particular interrupt vector to the host system 3.

Due to the asynchronous nature of completion processing in data storage systems that use NVMe controllers, these systems are susceptible to spurious hardware interrupts. Most spurious interrupts occur when there is a race condition between the host system software configuring the interrupt-related registers and the storage controller sending out the interrupt. The asynchronous relationship between the device's sending of MSI-X interrupts via Memory Write Transaction Layer Packets (MWr TLPs), along with the host's masking of the MSI-X interrupts via MWr TLPs, along with the host's opportunistic process of completions create race conditions that allow interrupts generated by the device to become spurious. Spurious interrupts can cause software programs being executed by the host CPU to misbehave or operate inefficiently. For this reason, storage controller designers always try to design storage controllers to minimize the occurrence of spurious interrupts. Spurious interrupts, however, are almost impossible to eliminate completely.

For example, a first scenario that can result in the occurrence of a spurious interrupt can result when the host CPU 11 is processing completions contained in a CQ in best-efforts manner. For this scenario, it will be assumed that host system 3 has sent commands A and B sequentially to the storage controller 4. When the storage controller 4 has completed processing of commands A and B, the storage controller 4 posts a completion of command A to the host system 3 and a completion of command B to the host system 3, both of which are stored in the same CQ. When the storage controller 4 posts the completion of command A, the storage controller 4 composes a first interrupt and posts the first interrupt to the host system 3 to inform it that a completion for command A is in the CQ.

When the storage controller 4 posts the completion of command B to the CQ, it composes a second interrupt to inform the host system 3 that the controller 4 has posted a completion for command B in the CQ. However, if the MSI-X mask associated with that interrupt vector is already set, the controller 4 does not post the second interrupt to the host system 3, but maintains the interrupt as pending in the controller 4. In addition, because the host system 3 is processing completions in the CQ on a best-efforts basis, it is possible that the host system 3 will process the completions associated with both commands, even though the second interrupt was never posted to the host system 3. Once host system 3 clears the corresponding MSI-X mask, the storage controller 4 may immediately send out the pending interrupt because of the pending interrupt status in the controller 4. However, in this scenario, the host system 3 has already processed both of the completions, and therefore the interrupt associated with the completion of command B would be spurious.

An example of a second scenario that can result in the occurrence of a spurious interrupt is when the host system 3 sets the MSI-X mask and the storage controller 4 leaks out an interrupt that was posted before the controller 4 was aware that the mask was set and was travelling through the hardware pipeline. This can happen if, for example, the storage system 2 has multiple storage controllers 4 that post interrupts in different ways. For example, one controller 4 may compose an interrupt before checking the associated MSI-X mask whereas another controller 4 may check the associated MSI-X mask before composing an interrupt. This is more likely to be a problem in cases where one of the controllers 4 incurs a lot of latency in composing an interrupt due to tasks associated with composing the interrupt such as, for example, fetches, arbitration, etc. In these types of situations, it is possible that the MSI-X mask bit was set after the controller 4 began composing an interrupt, but before the controller 4 posted the interrupt to the host system 3. Consequently, the interrupt becomes spurious. In some cases, the controller 4 may be configured to confirm that the MSI-X mask bit is not set as a last step prior to sending out an interrupt. While this may reduce the chance of sending out a spurious interrupt, it can be a waste of power and bandwidth if the MSI-X mask bit is already set when the confirmation process is performed.

Accordingly, a need exists for a system and method for reducing spurious interrupts in a data storage system.

SUMMARY OF THE INVENTION

The invention is directed to data storage systems, storage controllers for use in data storage systems and methods for use in data storage systems for reducing occurrences of spurious interrupts. The data storage system comprises a host system, a communications bus interconnected with the host system, and a storage controller interconnected with the communications bus. The host system comprises a processor and a system memory device. At least a portion of the system memory device comprises CQs for storing completions to be processed by the system processor. The storage controller comprises a controller processor, a controller memory device, and a host interface device.

After the storage controller posts a completion to the host system and prior to the storage controller sending an interrupt associated with the completion to the host system, the host interface device determines whether or not at least one pending completion is currently contained in a corresponding one of a plurality of CQs. If the host interface device determines that at least one pending completion is currently contained in the corresponding one of the CQs, the host interface device makes a first determination as to whether or not an interrupt mask associated with an interrupt vector that is also associated with the posted completion is in a first state or a second state and whether at least one pending completion is currently contained in the corresponding one of the CQs. If the host interface device determines that the interrupt mask is in the second state and that at least one pending completion is currently contained in the corresponding one of the CQs, the host interface device causes an interrupt to be composed. Prior to sending the interrupt to the host system, the host interface device makes a second determination as to whether or not the interrupt mask is in the first state or the second state and whether or not at least one pending completion is currently contained in a corresponding one of the CQs.

The method comprises:

after the storage controller posts a completion to the host system and prior to the storage controller sending an interrupt associated with the completion to the host system, determining whether or not at least one pending completion is currently contained in a corresponding one of a plurality of CQs;

if the host interface device determines that at least one pending completion is currently contained in the corresponding one of the CQs, making a first determination as to whether or not an interrupt mask associated with an interrupt vector that is also associated with the posted completion is in a first state or a second state and whether at least one pending completion is currently contained in the corresponding one of the CQs;

if the host interface device determines that the interrupt mask is in the second state and that at least one pending completion is currently contained in the corresponding one of the CQs, causing an interrupt to be composed in the host interface device; and prior to sending the interrupt to the host system, making a second determination in the host interface device as to whether or not the interrupt mask is in the first state or the second state and whether or not at least one pending completion is currently contained in a corresponding one of the CQs.

These and other features and advantages of the invention will become apparent from the following description, drawings and claims.

DETAILED DESCRIPTION OF AN ILLUSTRATIVE EMBODIMENT

Figure 1:
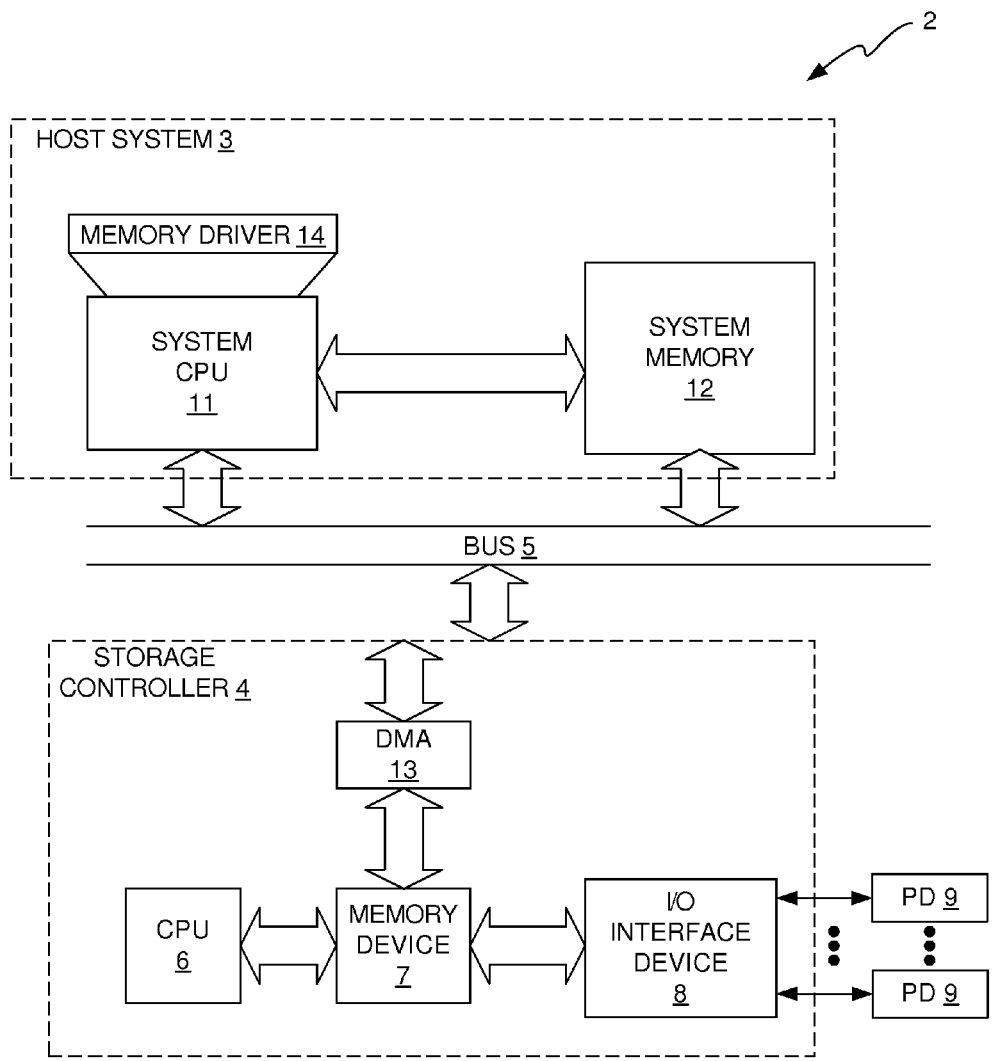
FIG. 1 illustrates a block diagram of a known data storage system.

In accordance with illustrative embodiments described herein, the storage controller maintains, for each interrupt vector, (1) a pending status that indicates whether one or more completions are pending in the CQ associated with the interrupt vector, and (2) an in-progress status that indicates whether or not the storage controller is currently in the process of composing an interrupt. The storage controller utilizes these two statuses to reduce or eliminate spurious interrupts by preventing an interrupt from being composed if there are no completions in the CQ, by preventing an interrupt from being composed if the corresponding interrupt mask has been set before composition of the interrupt begins, and by preventing an interrupt from being sent to the host system in cases where the interrupt mask was set after composition of the interrupt began, but before the interrupt has been sent to the host system. A few illustrative, or exemplary, embodiments of systems and methods for accomplishing these goals will now be described with reference to FIGS. 2-4, in which like reference numerals represent like components, elements, features or steps.

Figure 2:
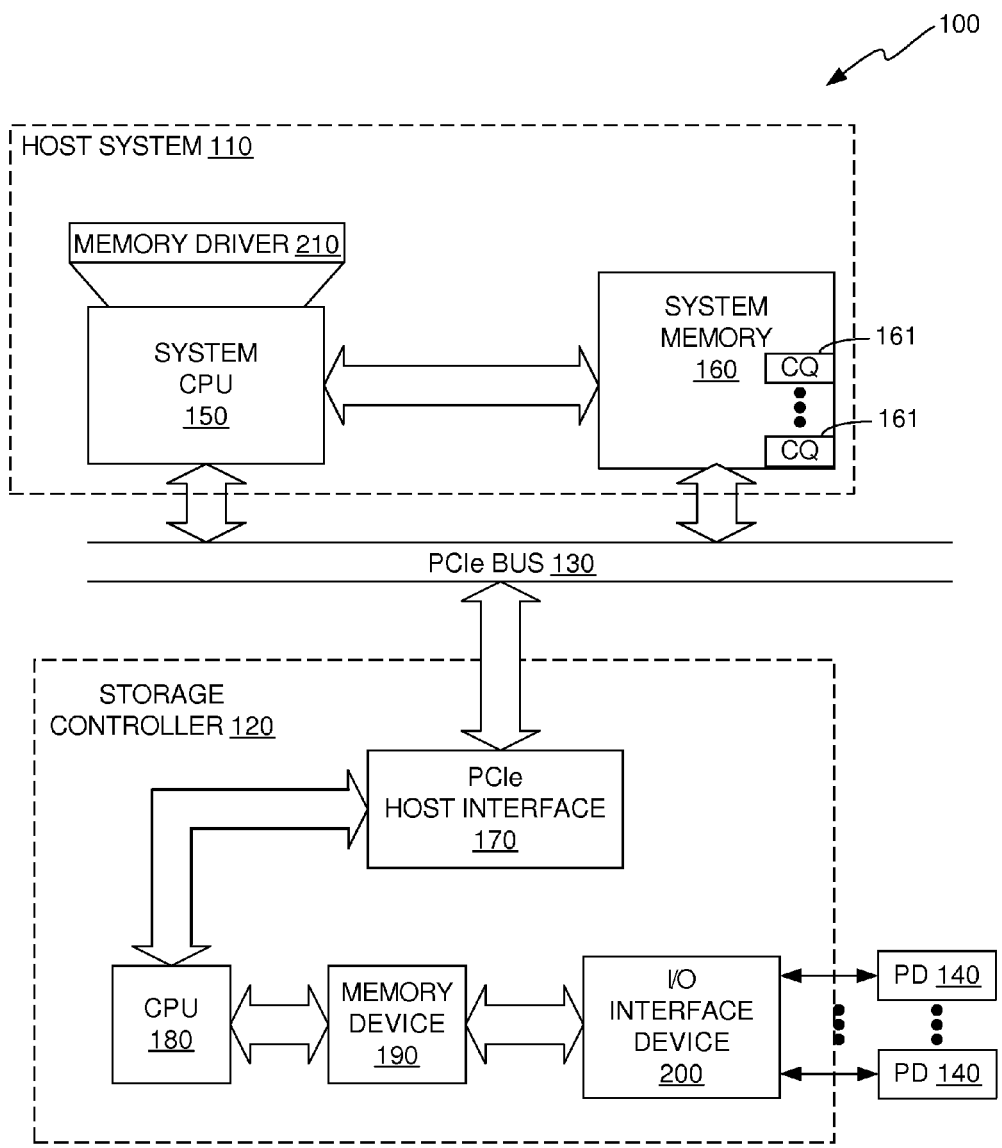
FIG. 2 illustrates a block diagram of the data storage system having reduced spurious interrupts in accordance with an illustrative embodiment.

FIG. 2 illustrates a block diagram of the data storage system 100 having reduced spurious interrupts in accordance with an illustrative embodiment. The system 100 includes a host system 110, a storage controller 120, a bus 130, and an array of PDs 140. The PDs 140 are typically, but not necessarily, flash memory devices or some other type of nonvolatile memory devices. The host system 110 includes a system CPU 150 and a system memory device 160. The storage controller 120 includes a PCIe or like host interface device 170, a controller CPU 180, controller memory device 190, and an I/O interface device 200.

In accordance with this illustrative embodiment, the bus 130 is a PCIe bus, the controller memory device 190 is static random access memory (SRAM) device, and the storage controller 120 is an NVMe-compliant and PCIe-compliant storage controller. The storage controller 120 may include other or additional types of memory devices, such as read only memory (ROM) devices and other types of RAM devices, for example. The controller memory device 190 should be viewed as comprising one or more of such memory devices. For example, the controller memory device 190 may include a ROM device that stores software and/or firmware for execution by the controller CPU 180 and an SRAM device that acts as a buffer for communicating with the I/O interface device 200. The storage controller 120 communicates via the PCIe host interface device 170 and the PCIe bus 130 with the host system 110. The system CPU 150 runs a memory driver software stack 210 that stores commands and data in the system memory device 160. Commands and data are transferred via the PCIe bus 130 and PCIe host interface device 170 from the system memory device 160 to the storage controller 120 and written by the controller CPU 180 to the controller memory device 190.

In general, when the controller CPU 180 completes a command or a string of commands, it posts an interrupt to the host system 110 to notify the host system 110 that the command or string of commands has been completed. However, in accordance with embodiments described herein, the PCIe host interface device 170 of the storage controller 120 performs tasks associated with maintaining the aforementioned pending and in-progress statuses and utilizing these statuses to reduce or eliminate spurious interrupts, as will now be described with reference to an illustrative embodiment.

Figure 3:
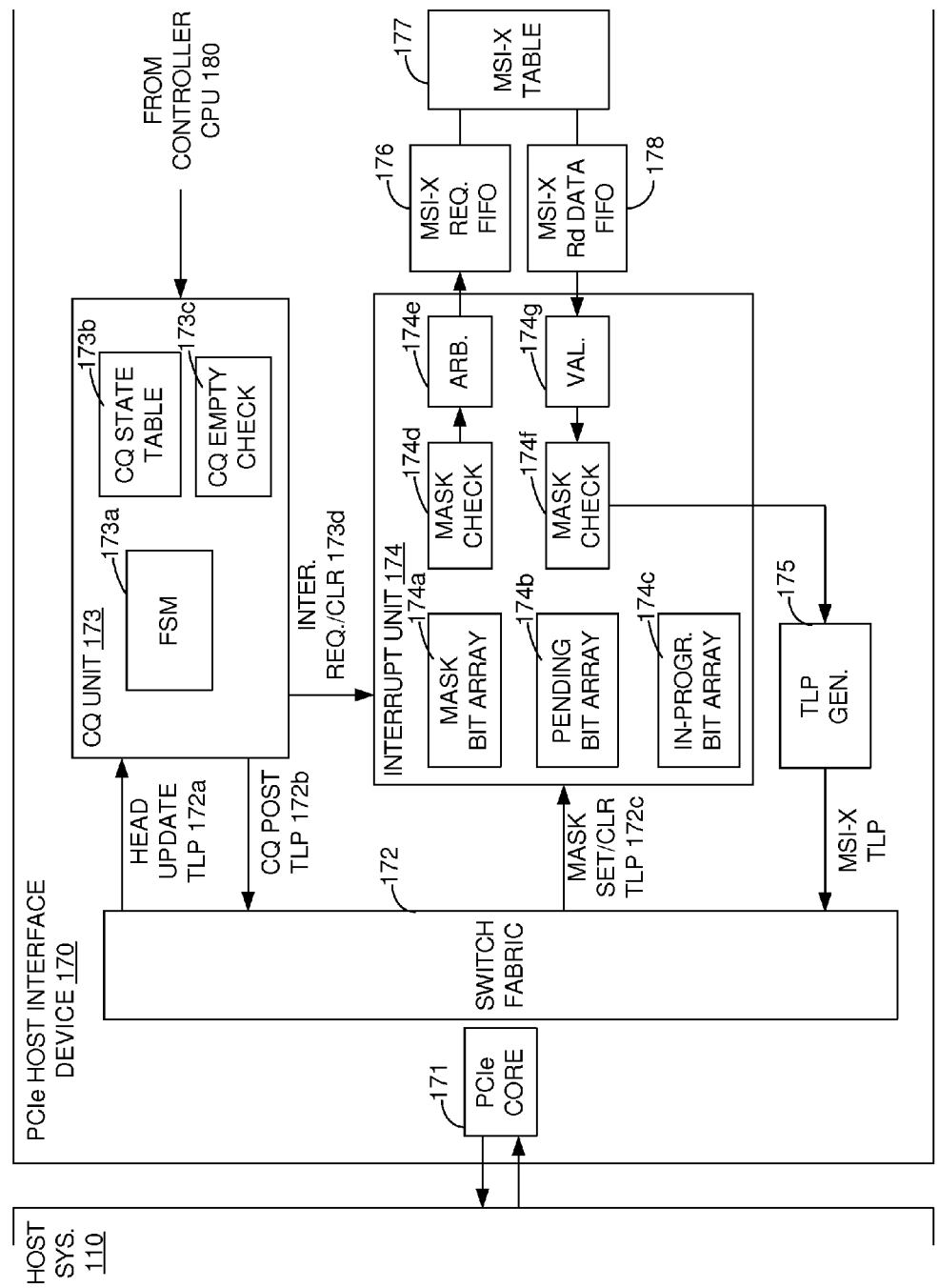
FIG. 3 illustrates a block diagram of the PCIe host interface device shown in FIG. 2 in accordance with an illustrative embodiment.

FIG. 3 illustrates a block diagram of the PCIe host interface device 170 in accordance with an illustrative embodiment. In accordance with this illustrative embodiment, the PCIe host interface device 170 comprises a combination of logical hardware blocks that operate in conjunction with one another to perform typical functions of a PCIe host interface device, and in addition, to maintain and use the pending and in-progress statuses to reduce or eliminate spurious interrupts. These blocks include a PCIe core 171, a switching fabric 172, a Completion Queue (CQ) unit 173, an interrupt unit 174, a transaction layer packet (TLP) generator 175, an MSI-X request FIFO 176, an MSI-X table 177, and an MSI-X read data FIFO 178. The CQ unit 173 comprises a finite state machine (FSM) 173a, a CQ state table 173b and a CQ empty checker 174c. The interrupt unit 174 comprises a mask bit array 174a, a pending bit array 174b, an in-progress bit array 174c, a first mask checker 174d, an arbitrator 174e, a second mask checker 174f, and a validator 174g.

The PCIe core 171 and the switching fabric 172 perform the typical functions associated with communicating over a PCIe interface. The PCIe core 171 performs link layer and physical layer tasks in accordance with the PCIe protocol, whereas the switching fabric 172 handles routing of TLPs to the proper blocks of the PCIe host interface device 170. These are typical PCIe functions that enable the PCIe host interface device 170 and the host system 110 to communicate with one another. The TLP generator 175 performs typical TLP generation tasks. The arbitrator 174e and the validator 174g and blocks 176-178 perform typical tasks associated with composing an interrupt.

The CQ unit 173 maintains the states of the CQs 161 (FIG. 2) in the CQ state table 173b and uses those states to determine whether or not completions are pending in the CQs 161, which reside in the system memory device 160. The CQ unit 173 receives head update TLPs 172a from the host system 110 and then uses the information contained in the head update TLPs 172a to make updates to the CQ state table 173b. The FSM 173a of the CQ unit 173 generates an Interrupt Request/Clear signal 173d based on the state information contained in the CQ state table 173b. The CQ state table 173b contains the states of the CQs 161, such as the head and tail pointers of the CQs 161. When a command that was forwarded by the host system 110 to the storage controller 120 has been completed by the controller CPU 120, the controller CPU 120 notifies the CQ unit 173 of the completion. The CQ unit 173 then posts the completion to the host system 110 by sending a CQ post TLP 172b to the host system 110, which boosts the tail pointer associated with the CQ 161 in the CQ state table 173b. When the system CPU 150 processes the completion stored in the CQ 161, the head pointer of the CQ 161 changes and the host system 110 sends a head update TLP 172a to the CQ unit 173, which the CQ unit 173 then uses to update the head pointer contained in the CQ state table 173b.

If the CQ states contained in the CQ state table 173b indicate that there are no completions in the corresponding CQ 161, then there is no need for an interrupt to be sent to the host system 110. To determine whether or not there are any completions in the CQs 161, the CQ empty checker 173c checks the CQ state table 173b when the head pointer of one of the CQs 161 changes and when the tail pointer of one of the CQs 161 changes. If the checker 173c determines that the CQ states indicate that there are no pending completions in the corresponding CQ, then the FSM 173a deasserts the Interrupt Request/Clear signal 173d. If the checker 173c determines from the CQ states contained in the table 173b indicate that there is at least one completion in the corresponding CQ, then the FSM 173a asserts the Interrupt Request/Clear signal 173d.

Thus, the Interrupt Request/Clear signal 173d is always asserted when the CQ unit 173 posts a completion to the host system 110. The Interrupt Request/Clear signal 173d is deasserted when the CQ unit 173 receives a head pointer update from the host system 110 and the CQ unit 173 determines that the corresponding CQ 161 is empty. However, if the CQ unit 173 receives a head pointer update from the host system 110 and the CQ unit 173 determines that the corresponding CQ 161 still contains entries, the Interrupt Request/Clear signal 173d remains in the asserted state.

The interrupt unit 174 is responsible for composing interrupts and for sending interrupts to the host system 110 (FIG. 2). The interrupt unit 174 is also responsible for maintaining the mask bit array 174a, the pending bit array 174b and the in-progress bit array 174c, all which are used by the method to reduce or eliminate the occurrence of spurious interrupts. The interrupt unit 174 uses the state of the Interrupt Request/Clear signal 173d to determine whether it is to compose an interrupt. The interrupt unit 174 also updates the pending bit array 174c based on the state of the Interrupt Request/Clear signal 173d. If the Interrupt Request/Clear signal 173d is asserted, then the interrupt unit 174 sets a corresponding pending vector in the pending bit array 174b. If the Interrupt Request/Clear signal 173d is deasserted, then the interrupt unit 174 clears a corresponding pending vector in the pending bit array 174b. The Interrupt Request/Clear signal 173d is actually a set of signals that includes two strobes that assert and deassert a pending bit of the pending bit array 174b and a handle, or address, that provides the location of the pending bit in the pending bit array 174b.

unit 174 will not post the interrupt to the host system 110. If the second mask checker 174f determines that the corresponding MSI-X mask is cleared and that the corresponding in-progress vector is also cleared, the interrupt unit 174 will not post the interrupt to the host system 110. If the second mask checker 174f determines that the corresponding MSI-X mask is cleared and that the corresponding in-progress vector is set, the interrupt unit 174 will post the interrupt to the host system 110.

The following pseudocode represents the algorithm that is performed by the PCIe host interface device 170 shown in FIG. 3 to prevent or at least reduce the occurrence of spurious interrupts.

```
//After a completion is posted to the system memory
while ( ) {                                                           First while loop 1
if (a completion is posted) && (interrupt is enabled for the queue)
{
if (request to set pending) {
pending[vector] = ~inprogress[vector]
} else { // request to clear pending due to queues becoming empty
pending[vector] = 0
inprogress[vector] = 0 }
}
}
//Check pending bit to start composing an interrupt
while ( ) {                                                           Second while loop
if (!pending) && (vector not masked or disabled) {
arbitrate for one interrupt vector
start composing an interrupt
pending[vector] = 0
inprogress[vector] = 1 }
}
//When an interrupt is composed and ready to be sent to the host
while ( ) {                                                           Third while loop
if (vector not masked) && inprogress[vector] {
inprogress[vector] = 0
send interrupt to the host }
else {
pending[vector] = inprogress[vector]
inprogress[vector] = 0 }
}
```

The interrupt unit 174 updates the MSI-X masks stored in the mask bit array 174a based on the state of the Mask Set/Clear TLP 172c output from the switching fabric 172 to the interrupt unit 174. While the MSI-X mask associated with an interrupt vector is set, the interrupt unit 174 will not send an interrupt corresponding to that interrupt vector to the host system 110. However, even when the Mask Set/Clear TLP 172c indicates that the corresponding MSI-X mask is cleared, there are times when the interrupt unit 174 will not send an interrupt to the host system 110, such as when there are no pending completions in the corresponding CQ. As will be described below in detail, the interrupt unit 174 utilizes information contained in the mask bit array 174a, in the pending bit array 174b, and in the in-progress bit array 174c to decide whether an interrupt is to be composed and/or sent to the host system 110.

Prior to the interrupt unit 174 composing an interrupt, the first mask checker 174d checks the corresponding MSI-X mask to determine whether or not it is set. If it is set, the interrupt unit 174 does not compose an interrupt, i.e., the process that would be performed by blocks 174e, 176-178 and 174g to compose an interrupt is not performed. Also, after an interrupt has been composed and prior to the interrupt being posted to the host system 110, the second mask checker 174f checks the corresponding MSI-X mask to determine whether or not it is set. If the second mask checker 174f determines that the MSI-X mask is set, the interrupt The first while loop above corresponds to the portion of the algorithm that is performed by the CQ unit 173 to assert or deassert the Interrupt Request/Clear signals 173d based on the states contained in the CQ state table 173b and to the portion of the algorithm that is performed by the interrupt unit 174 to set or clear the pending vector and to clear the in-progress vector. In general, the first while loop determines whether there are any completions in the corresponding CQ 161 as indicated by the state table 173b; if so, it sets the corresponding pending vector; if not, it clears the corresponding pending and in-progress vectors.

The pending bit array 174b contains pending vectors that are associated with respective completions stored in the CQs 161. If a pending vector in the array 174b is set, this means that a corresponding completion is contained in the CQ 161, as indicated by the states contained in the CQ state table 173b. Thus, when the pending vector is set, this informs the interrupt unit 174 that it is to compose an interrupt unless there is some other information that indicates to the interrupt unit 174 that it should not compose and interrupt, such as a set MSI-X mask. When the CQ unit 173 asserts the Interrupt Request/Clear signals 173d, this notifies the interrupt unit 174 to set the corresponding pending vector in the pending bit array 174b.

The second while loop above corresponds to the portion of the algorithm that is performed by the interrupt unit 173. This algorithm portion uses the first mask checker 174d to determine whether an interrupt needs to be composed, and if so, composes the interrupt. The in-progress bit array 174c contains in-progress vectors that indicate whether or not an interrupt is currently being composed. Each in-progress vector is associated with a respective pending vector and with a respective MSI-X mask. If a pending vector in the array 174b is set and the MSI-X mask is not set, then the interrupt unit 174 will compose an interrupt. The operations represented by blocks 174e, 174g and 176-178 for composing an interrupt are then performed. Once the interrupt has been composed, the pending vector is cleared and the in-progress vector is set.

The third while loop above corresponds to the portion of the algorithm that is performed by the interrupt unit 174 using the second mask checker 174f. The second mask checker 174f determines whether an interrupt needs to be sent to the host system 110, and if so, causes the interrupt to be sent to the host system 110. If the in-progress vector in the array 174c is set and the MSI-X mask is not set, then the interrupt unit 174 will send the interrupt to the host system 110. The in-progress vector is then cleared. If the in-progress vector is not set or the MSI-X mask is set, then the interrupt unit 174 will not send the interrupt to the host system 110. The pending vector is then assigned the value of the in-progress vector and the in-progress vector is cleared.

The processes described above with reference to FIG. 3 solve the problems presented by the aforementioned first scenario. Using the CQ state table 173b to monitor the states of the CQs 161 to determine whether they contain pending completions ensures that an interrupt will not be composed or sent to the host system 110 if a corresponding completion is not currently pending. Therefore, if completions are being processed by the host CPU 180 in a best-efforts fashion, the possibility that this could lead to the occurrence of a spurious interrupt is reduced or eliminated because it prevents an interrupt from being sent to the host system 110 if the CQ state table 173b indicates that a corresponding completion is not currently pending in the CQ 161.

The processes described above with reference to FIG. 3 also solve the problems presented by the aforementioned second scenario. Checking the MSI-X mask stored in the mask bit array 174a before and after composing an interrupt ensures that an interrupt will not be composed or sent to the host system 110 if it is not needed. In addition, checking the MSI-X mask before composing an interrupt conserves power and bandwidth in that is prevents the interrupt unit 174 from spending the time and resources that are needed to compose an interrupt when an interrupt cannot be sent to the host system 110 at that time.

Checking the MSI-X mask before posting an interrupt to the host system 110 prevents a spurious interrupt from occurring in cases where an interrupt was already in the hardware pipeline at the time that the corresponding MSI-X mask was set. Checking the in-progress vector after the interrupt has been composed but before the interrupt is posted prevents a spurious interrupt from being sent to the host system 110 in cases where the interrupt was in the process of being composed when the corresponding CQ 161 became empty. It can be seen from the pseudocode that the pending and in-progress vectors are cleared at the end of the first while loop if the CQ 161 is empty, and that the in-progress vector is set and the pending bit is cleared at the end of the second while loop when the interrupt is composed. Therefore, if the second mask checker 174f finds that the in-progress vector has been cleared, this informs the interrupt unit 174 that it is not to post the interrupt to the host system 110 even if the MSI-X mask is cleared and even though the in-progress vector was set at the time that the composition process was underway.

Figure 4:
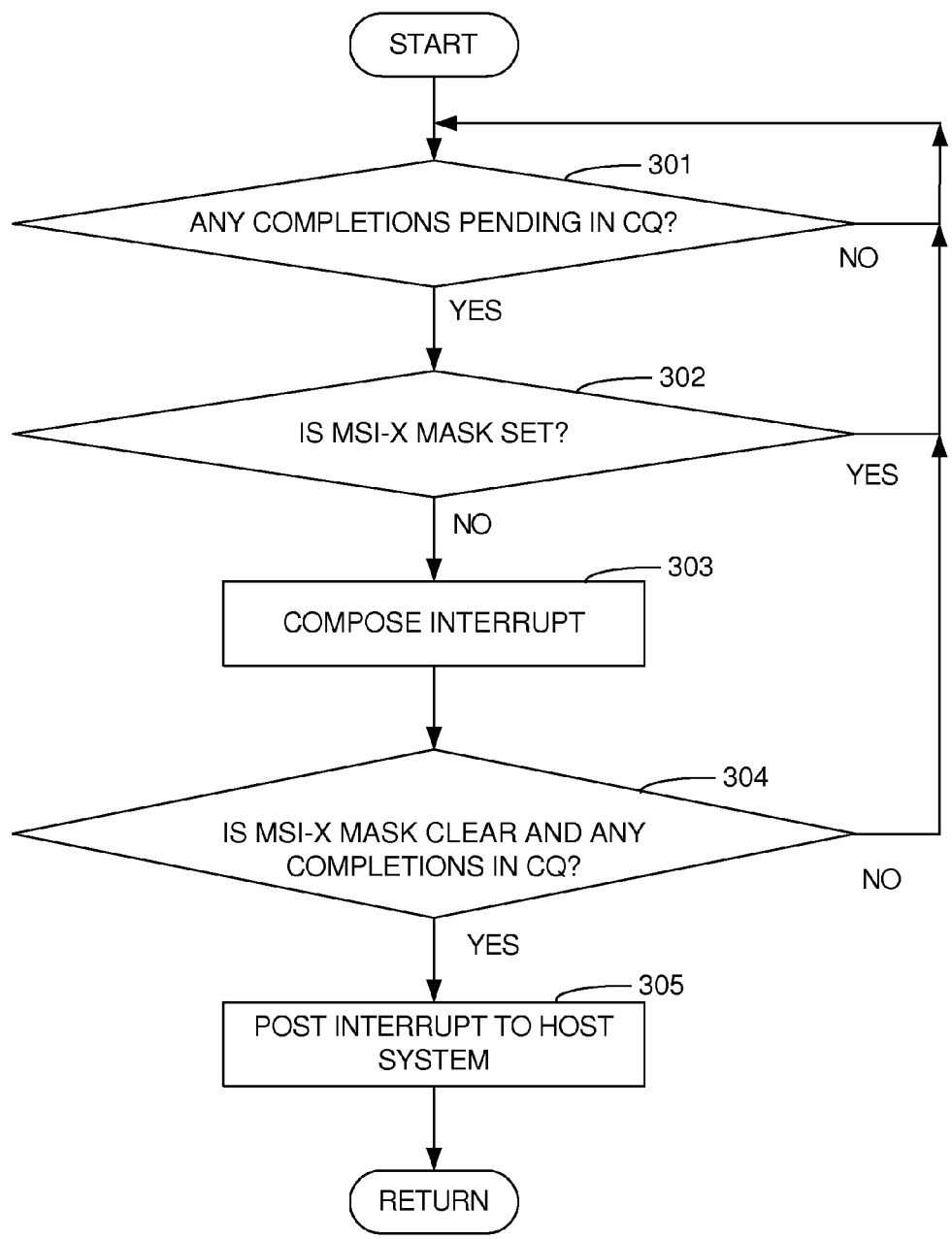
FIG. 4 is a flow diagram that represents the method in accordance with an illustrative embodiment.

FIG. 4 is a flow diagram that represents the method in accordance with an illustrative embodiment. The method starts when the CQ unit 173 posts a completion to the host system 110. The CQ unit 173 knows which of the CQs 161 is associated with the completion because each completion is an entry in a particular one of the CQs 161. A determination is made as to whether there are any pending completions in the corresponding CQ 160, as indicated by block 301. In accordance with the illustrative embodiment, the CQ empty checker 173c performs this task by checking the CQ state table 173b to determine whether or not the CQ states indicate that there is at least one pending completion in the CQ 161. As indicated above, the CQ empty checker 173c checks the CQ state table 173b when the CQ tail pointer changes and when the CQ head pointer changes.

If a determination is made at block 301 that there are no pending completions in the CQ 161, then the method continues to perform the process represented by block 301 of checking the CQ state table 173b when the CQ head and tail pointers change. If a determination is made at block 301 that one or more completions are in the CQ 161, then the method proceeds to block 302.

At block 302, a determination is made as to whether the corresponding MSI-X mask is set. If so, the method returns to block 301 and continues checking the CQ state table 173b when the CQ head and tail pointers change. If a determination is made at block 302 that the corresponding MSI-X mask is not set (i.e., it is cleared), then the method proceeds to block 303. In accordance with this illustrative embodiment, the determination of block 302 is performed by the first mask checker 174d, which checks the mask bit array 174a to determine whether the MSI-X mask associated with the interrupt vector is set. At block 303, the interrupt unit 174 composes an interrupt, which involves tasks performed by blocks 174e, 176, 177, 178, and 174g. It should be noted that if the process has reached block 303, this means that there is at least one completion in the CQ 161 AND the MSI-X mask is not set.

Once the interrupt has been composed, the method proceeds to block 304. At block 304, a determination is made as to whether the corresponding MSI-X mask is still clear and whether there is still at least one completion in the CQ. In accordance with this illustrative embodiment, the second mask checker 174g performs this task by checking the mask bit array 174a and the in-progress bit array 174c to determine whether the MSI-X mask is set and whether the in-progress vector is set, respectively. The reason that the in-progress vector is checked is because it is possible that the CQ unit 173 will decide that the CQ 161 is empty while the interrupt is being composed, which would then result in the pending vector and the in-progress vector both being cleared, as seen in the "else" statement in the first while loop of the above pseudocode. If the second mask checker 174g determines either that the MSI-X mask is set or that the in-progress vector has been cleared, the interrupt is not posted to the host system 110 and the method returns to block 301.

If the second mask checker 174g determines that the MSI-X mask is cleared and that the in-progress vector is set, the method proceeds to block 305. At block 305, an interrupt that was composed at block 303 is posted to the host system 110. In accordance with the illustrative embodiment, the TLP generator 175 (FIG. 3) generates the interrupt TLP and causes it to be sent to the host system 110 via the switching fabric 172 and the PCIe core 171. The pending vector and the in-progress vector are then cleared in the pending and in-progress bit arrays 174*b* and 174*c*, respectively.

It should be noted that the method and system of the invention have been described with reference to a few illustrative embodiments for the purposes of demonstrating the principles and concepts of the invention. Specifically, the method and system have been described with reference to a storage controller 120 that is specifically configured to comply with the PCIe and NVMe protocols. The invention is not limited to configurations of the storage controller 120 that are compliant with these protocols, as will be understood by those of skill in the art in view of the description being provided herein. The configuration of the PCIe host interface device 170 shown in FIG. 3 is merely an example of the manner in which the invention may be implemented, as will be understood by those of skill in the art in view of the description being provided herein.

It should also be noted that the information that has been described above as being conveyed by setting or clearing a bit can instead be conveyed by clearing or setting a bit, respectively. The logical value of a bit may be considered its state, such that a logic 1 and a logic 0 correspond to first and second states, respectively, or to second and first states, respectively. As an example, assuming that the first and second states correspond to logic 1 and logic 0 values, respectively, a pending vector having a first state corresponding to a logic 1 may be used to indicate that the CQ 161 is not empty and a pending vector having a second state corresponding to a logic 0 may be used to indicate that the CQ 161 is empty. However, this notation for the states could be reversed such that a pending vector having a first state corresponding to a logic 0 indicates that the CQ 161 is not empty and a pending vector having a second state corresponding to a logic 1 may be used to indicate that the CQ 161 is empty.

It should also be noted that while the tasks associated with performing the method have been described as being performed in hardware in digital logic, they could instead be performed in a combination of hardware and software or firmware. One of the advantages of performing these tasks in digital logic is that they can be performed at extremely high speeds, which is very important from a performance standpoint. However, it is possible that some or all of these tasks could be offloaded to a processor of the storage controller 120, such as controller CPU 180 and performed in software or firmware. In such a case, the computer code for implementing functionality in software or firmware is stored on a non-transitory computer-readable medium (CRM), such as controller memory device 190 or some other memory device. The CRM may be any type of memory device including, but not limited to, magnetic storage devices, solid state storage devices, flash memory devices, and optical storage devices.

The controller CPU 180 typically comprises a microprocessor, but may comprise any type of processor that is capable of providing the functionality that is necessary or desired to perform the associated tasks, including, for example, a microcontroller, a digital signal processor (DSP), an application specific integrated circuit (ASIC), and a system on a chip (SOC). The term "processor," as that term is used herein, is intended denote these and other types of computational devices that may be programmed or configured to perform the tasks described above and any additional tasks that are deemed necessary to allow the CPU 180 to perform its roles. In addition, the term "processor," as that term is used herein, is also intended to denote computational devices that perform functions in hardware, such as state machines embedded in ICs.

As will be understood by persons of skill in the art, many other variations may be made to the illustrative embodiments described above without deviating from the scope of the invention. All such variations are within the scope of the invention.

What is claimed is:

1. A data storage system configured to reduce an occurrence of spurious interrupts, the system comprising:
a host system comprising a system processor and a system memory device, wherein at least a portion of the system memory device comprises completion queues (CQs) for storing completions to be processed by the system processor;
a communications bus interconnected with the host system;
a storage controller interconnected with the communications bus, the storage controller comprising a controller processor, a controller memory device, and a host interface device, and wherein after the storage controller posts a completion to the host system and prior to the storage controller sending an interrupt associated with the completion to the host system, the host interface device determines whether or not at least one pending completion is currently contained in a corresponding one of a plurality of completion queues (CQs), wherein if the host interface device determines that at least one pending completion is currently contained in the corresponding one of the CQs, the host interface device makes a first determination as to whether or not an interrupt mask associated with an interrupt vector that is also associated with the posted completion is in a first state or a second state and whether at least one pending completion is currently contained in the corresponding one of the CQs, wherein if the host interface device determines that the interrupt mask is in the second state and that at least one pending completion is currently contained in the corresponding one of the CQs, the host interface device causes an interrupt to be composed, and wherein prior to sending the interrupt to the host system, the host interface device makes a second determination as to whether or not the interrupt mask is in the first state or the second state and whether or not at least one pending completion is currently contained in a corresponding one of the CQs.

2. The data storage system of claim 1, wherein if the host interface device determines, after the interrupt has been composed, that the interrupt mask is in the second state and that at least one pending completion is currently contained in the corresponding one of the CQs, the host interface device causes the interrupt to be sent to the host system.

3. The data storage system of claim 2, wherein if the host interface device determines, after the interrupt has been composed, that the interrupt mask is in the first state, the host interface device does not send the interrupt to the host system.

4. The data storage system of claim 2, wherein if the host interface device determines, after the interrupt has been composed, that the interrupt mask is in the second state and that at least one pending completion is not currently contained in the corresponding one of the CQs, the host interface device does not send the interrupt to the host system.

5. The data storage system of claim 1, wherein if the host interface device determines, prior to composing the interrupt, that at least one pending completion is not currently contained in the corresponding one of the CQs, the host interface device does not make the first determination and does not compose an interrupt.

6. The data storage system of claim 1, wherein if the host interface device determines, prior to composing the interrupt, that the interrupt mask is in the first state, the host interface device does not compose the interrupt.

7. A storage controller interconnected with a communications bus that is interconnected with a host system, the storage controller comprising:
a controller processor;
a controller memory device; and
a host interface device, wherein after the storage controller posts a completion to the host system and prior to the storage controller sending an interrupt associated with the completion to the host system, the host interface device determines whether or not at least one pending completion is currently contained in a corresponding one of a plurality of completion queues (CQs), wherein if the host interface device determines that at least one pending completion is currently contained in the corresponding one of the CQs, the host interface device makes a first determination as to whether or not an interrupt mask associated with an interrupt vector that is also associated with the posted completion is in a first state or a second state and whether at least one pending completion is currently contained in the corresponding one of the CQs, wherein if the host interface device determines that the interrupt mask is in the second state and that at least one pending completion is currently contained in the corresponding one of the CQs, the host interface device causes an interrupt to be composed, and wherein prior to sending the interrupt to the host system, the host interface device makes a second determination as to whether or not the interrupt mask is in the first state or the second state and whether or not at least one pending completion is currently contained in a corresponding one of the CQs.

8. The storage controller of claim 7, wherein if the host interface device determines, after the interrupt has been composed, that the interrupt mask is in the second state and that at least one pending completion is currently contained in the corresponding one of the CQs, the host interface device causes the interrupt to be sent to the host system.

9. The storage controller of claim 8, wherein if the host interface device determines, after the interrupt has been composed, that the interrupt mask is in the first state, the host interface device does not send the interrupt to the host system.

10. The storage controller of claim 8, wherein if the host interface device determines, after the interrupt has been composed, that the interrupt mask is in the second state and that at least one pending completion is not currently contained in the corresponding one of the CQs, the host interface device does not send the interrupt to the host system.

11. The storage controller of claim 7, wherein if the host interface device determines, prior to composing the interrupt, that at least one pending completion is not currently contained in the corresponding one of the CQs, the host interface device does not make the first determination and does not compose an interrupt.

12. The storage controller of claim 7, wherein if the host interface device determines, prior to composing the interrupt, that the interrupt mask is in the first state, the host interface device does not compose the interrupt.

13. A method for reducing an occurrence of spurious interrupts sent from a storage controller of a data storage system to a host system of the data storage system, the method comprising:
after the storage controller posts a completion to the host system and prior to the storage controller sending an interrupt associated with the completion to the host system, determining whether or not at least one pending completion is currently contained in a corresponding one of a plurality of completion queues (CQs);
if the host interface device determines that at least one pending completion is currently contained in the corresponding one of the CQs, making a first determination as to whether or not an interrupt mask associated with an interrupt vector that is also associated with the posted completion is in a first state or a second state and whether at least one pending completion is currently contained in the corresponding one of the CQs;
if the host interface device determines that the interrupt mask is in the second state and that at least one pending completion is currently contained in the corresponding one of the CQs, causing an interrupt to be composed in the host interface device; and
prior to sending the interrupt to the host system, making a second determination in the host interface device as to whether or not the interrupt mask is in the first state or the second state and whether or not at least one pending completion is currently contained in a corresponding one of the CQs.

14. The method of claim 13, further comprising:
if the host interface device determines, after the interrupt has been composed, that the interrupt mask is in the second state and that at least one pending completion is currently contained in the corresponding one of the CQs, causing the interrupt to be sent to the host system.

15. The method of claim 14, further comprising:
if the host interface device determines, after the interrupt has been composed, that the interrupt mask is in the first state, preventing the interrupt from being sent to the host system.

16. The method of claim 14, further comprising:
if the host interface device determines, after the interrupt has been composed, that the interrupt mask is in the second state and that at least one pending completion is not currently contained in the corresponding one of the CQs, preventing the interrupt from being sent to the host system.

17. The method of claim 13, further comprising:
if the host interface device determines, prior to composing the interrupt, that at least one pending completion is not currently contained in the corresponding one of the CQs, preventing the interrupt from being composed.

18. The method of claim 13, further comprising:
if the host interface device determines, prior to composing the interrupt, that the interrupt mask is in the first state, preventing the interrupt from being composed.

19. A computer program for reducing an occurrence of spurious interrupts in the data storage system, the computer program comprising computer code for execution by a processor of a storage controller of the data storage system, the computer program being embedded on a non-transitory computer-readable medium, the program comprising:
a first code portion that is executed after the storage controller has posted a completion of a command to a host system of the data storage system and prior to the storage controller sending an interrupt associated with the completion to the host system, the first code portion determining whether or not at least one pending completion is currently contained in a corresponding one of a plurality of completion queues (CQs) contained in a system memory device of the data storage system;

a second code segment, wherein if the host interface device determines that at least one pending completion is currently contained in the corresponding one of the CQs, the second code segment makes a first determination as to whether or not an interrupt mask associated with an interrupt vector that is also associated with the posted completion is in a first state or a second state and whether at least one pending completion is currently contained in the corresponding one of the CQs, wherein if the second code segment determines that the interrupt mask is in the second state and that at least one pending completion is currently contained in the corresponding one of the CQs, the second code segment causes an interrupt to be composed in the host interface device; and a third code segment, wherein prior to sending the interrupt to the host system, the third code segment makes a second determination in the host interface device as to whether or not the interrupt mask is in the first state or the second state and whether or not at least one pending completion is currently contained in a corresponding one of the CQs.

20. The computer program of claim 19, wherein if the third code segment determines that the interrupt mask is in the second state and that at least one pending completion is currently contained in the corresponding one of the CQs, the third code segment causes the interrupt to be sent to the host system.

21. The computer program of claim 20, wherein if the third code segment determines that the interrupt mask is in the first state, the third code segment prevents the interrupt from being sent to the host system.

22. The computer program of claim 20, wherein if the third code segment determines that the interrupt mask is in the second state and that at least one pending completion is not currently contained in the corresponding one of the CQs, the third code segment prevents the interrupt from being sent to the host system.

* * * * *